(12) United States Patent
Helot et al.

(10) Patent No.: US 6,556,435 B1
(45) Date of Patent: Apr. 29, 2003

(54) ADJUSTABLE HEIGHT DOCKING STATION AND COMPUTING DEVICE FOR USE THEREWITH

(75) Inventors: Jacques H Helot, Corvallis, OR (US); Daniel I Croft, Monmouth, OR (US); David A Williams, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 730 days.

(21) Appl. No.: 08/961,580

(22) Filed: Oct. 31, 1997

(51) Int. Cl.[7] .................................................. G06F 1/16
(52) U.S. Cl. ........................ 361/686; 361/683; D14/107
(58) Field of Search ................................. 361/686, 683; 364/708.1; 395/281–283; D14/107

(56) References Cited

U.S. PATENT DOCUMENTS

| | | | | |
|---|---|---|---|---|
| 2,044,589 A | * | 6/1936 | Morgan et al. ............. 361/686 |
| 5,212,628 A | * | 5/1993 | Bradbury ..................... 361/683 |
| 5,229,920 A | | 7/1993 | Spaniol et al. .............. 361/393 |
| 5,290,178 A | * | 3/1994 | Ma ............................. 361/686 |
| 5,436,792 A | * | 7/1995 | Leman et al. ............... 361/686 |
| 5,535,093 A | * | 7/1996 | Noguchi et al. ............ 361/686 |
| 5,644,516 A | | 7/1997 | Podwalny et al. ........ 364/708.1 |
| 5,668,570 A | * | 9/1997 | Ditzik ..................... 364/708.1 |
| 5,729,429 A | | 3/1998 | Margaritis et al. .......... 361/680 |
| 5,805,415 A | | 9/1998 | Tran et al. ................... 361/681 |
| 5,838,539 A | * | 11/1998 | Doss et al. .................. 361/686 |
| 5,921,697 A | * | 7/1999 | Karl et al. ................... 361/686 |

* cited by examiner

*Primary Examiner*—Darren Schuberg
*Assistant Examiner*—Lisa Lea-Edmonds

(57) ABSTRACT

A height adjustable docking station and a mobile computing device for use therewith. The docking station includes a structure for receiving the screen of a mobile computing device. This structure is coupled to a docking station body in such a manner that the height and viewing angle of the screen of a mobile computing device mounted in the structure can be adjusted. A mobile computing device with a flip around screen and a port configured for docking when the screen is flipped around is also disclosed.

15 Claims, 3 Drawing Sheets

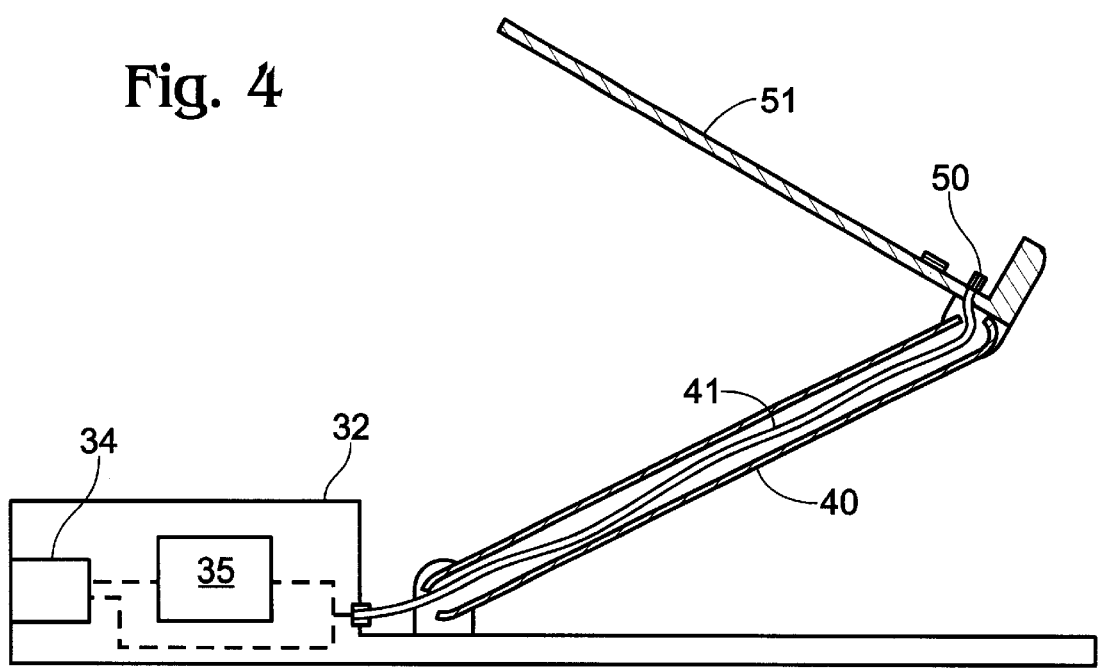
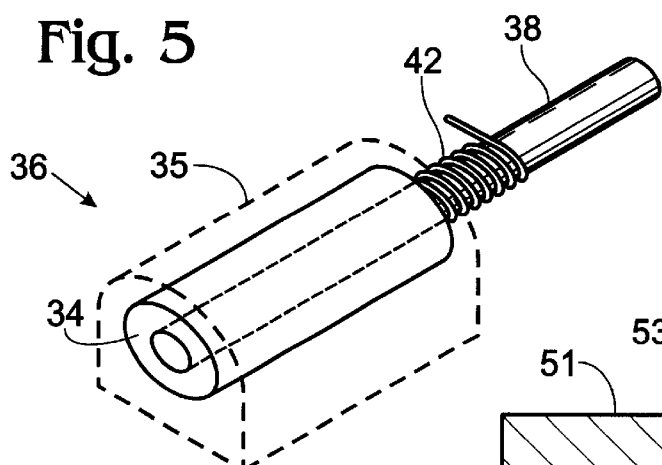
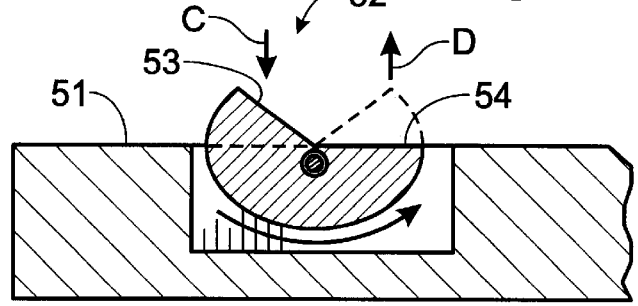
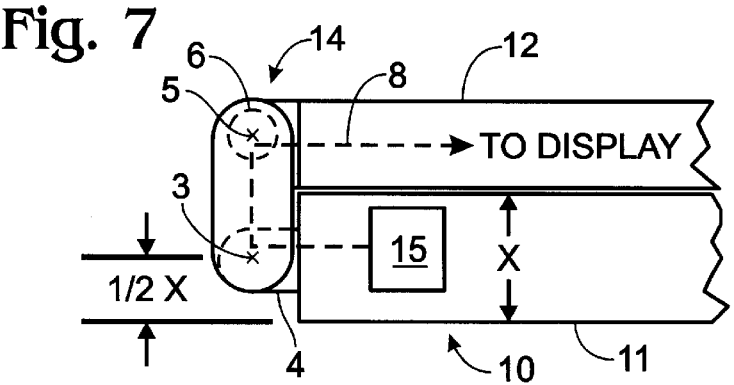

ADJUSTABLE HEIGHT DOCKING STATION AND COMPUTING DEVICE FOR USE THEREWITH

FIELD OF THE INVENTION

The present invention relates to docking stations for mobile computing devices.

BACKGROUND OF THE INVENTION

Advances in electronics, batteries and packaging technology have led to continued increases in the number of mobile computing devices in service. These mobile computing devices often have an associated docking station that permits ready access to printers, modems, networks, and peripherals that are more humanly comfortable, amongst other connections and attributes. Though beneficial for their intended purpose, these docking stations are to some extent disadvantageous as discussed below.

Mobile computing devices tend to be small to facilitate efficient mobility. Docking stations tend to be configured for desktop use in which a mobile computing device is docked at the station for data transmission or for running the desktop environment with the resources of the mobile computing device. When docked at a desk top station, the screen of a mobile computing device is small, located at a relatively far distance from an operator and positioned such that an operator often has to place his or her back, neck or head in an uncomfortable position to adequately see the screen.

Ergonomic studies of computer-human operator interfaces have determined that a preferred monitor or screen height is that at which the top of the screen is even with the horizontal line of sight of the operator. The preferred angle of the screen is at 90 degrees to the line of sight.

One attempt to alleviate the undesirably low screen height of docked mobile computing devices includes providing a regular desk top monitor on a stand above the docking station. Though this may alleviate some of the problems of low-level mobile computing device screen height, the additional monitor and stand are often undesirably expensive and consumptive of space. This arrangement may also provide insufficient adjustment of screen viewing angle.

SUMMARY OF THE INVENTION

Accordingly, it is an object of the present invention to provide a docking station that permits adjustment of the height of the screen of a mobile computing device docked at the station.

It is another object of the present invention to provide such a docking station that permits adjustment of the viewing angle of the screen of a mobile computing device docked at the station.

It is another object of the present invention to provide such a docking station that has a low profile design, permits non-height adjusted docking and is economical, durable and user-friendly to operate.

It is also an object of the present invention to provide a mobile computing device for use with such a docking station.

These and related objects of the present invention are achieved by use of a adjustable height docking station and computing device for use therewith as disclosed herein.

In one embodiment, the present invention includes a docking station body having a replicated port formed in at least a first wall thereof; a receiving port electrically coupled to said replicated port; and means coupled between said docking station body and said receiving port that permits movement of said receiving port relative to said replicated port. This relative movement preferably permits an operator to adjust the height and viewing angle of a screen of a mobile computing device docked at said docking station.

In another embodiment, the present invention includes a docking station body having a replicated port formed in at least a first wall thereof; a receiving port electrically coupled to said replicated port; a mechanism that receives a screen of a mobile computing device to be docked at said docking station; and means coupled between said docking station body and said screen receiving mechanism that permits adjustment of the height of said screen receiving mechanism relative to said docking station body.

In yet another embodiment, the present invention includes a housing having processing electronics therein; a data input mechanism provided at said housing and electrically coupled to said processing electronics for input of data thereto; a monitor screen capable of displaying electronic image data that is coupled to said housing and electrically coupled to said processing electronics for displaying image data therefrom; and means for coupling said screen to said housing such that said screen can move between a closed position where a viewing side of said screen is generally flush with a top side of said housing and a fully extended position where a non-viewing side of said screen is generally flush with a bottom side of said housing. The present invention also includes a mobile computing device with a docking station port provided on the same surface of the mobile computing device as the keyboard.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 4 is a cross-sectional view of the adjustment arm and a portion of the receiving tray in accordance with the present invention.

FIG. 5 is a perspective view of a connection hinge mechanism in accordance with the present invention.

FIG. 6 is a cut away view of a portion of the receiving tray illustrating an undocking mechanism in accordance with the present invention.

FIG. 7 is a side view of the double hinge arrangement of the mobile computing device of FIG. 1 in accordance with the present invention.

DETAILED DESCRIPTION

Figure 1:
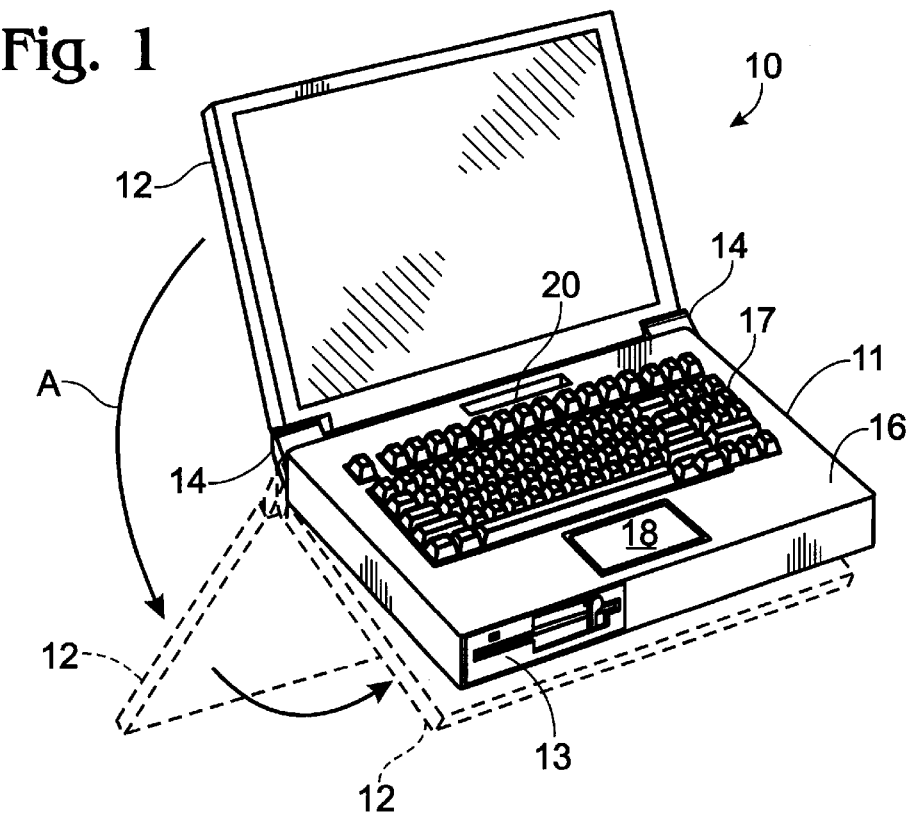
FIG. 1 is a perspective view of a mobile computing device for use with a docking station in accordance with the present invention.

Referring to FIG. 1, a perspective view of a mobile computing device 10 for use with a docking station in accordance with the present invention is shown. Mobile computing device 10 includes a housing 11 in which are provided a microprocessor, fast access and disk memory, a battery and other conventional componentry that is known and is not shown in FIG. 1. The screen 12 of device 10 is coupled through two double hinges discussed in more detail below with reference to FIG. 7 that permit screen 12 to rotate between a conventional closed position to a position in which the backside of screen 12 contacts the bottom 16 of the mobile computing device. Arrow A indicates the path of rotation of screen 12 towards the final folded back position of screen 12 shown in FIG. 2. An external disk drive 13, a keyboard 17, a track pad 18 and a docking port 20 are also shown in the perspective of FIG. 1.

Figure 2:
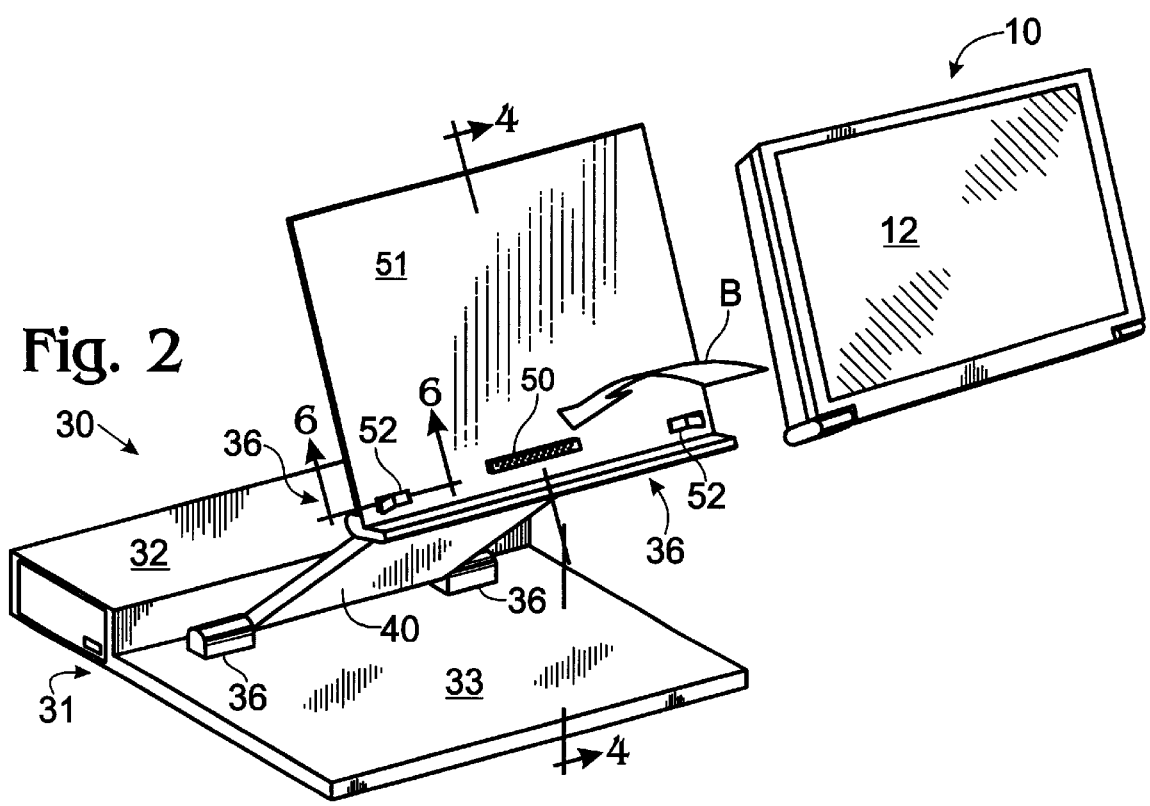
FIG. 2 is a perspective view of an adjustable height docking station and mobile computing device in accordance with the present invention.

Referring to FIG. 2, a perspective view of an adjustable height docking station 30 and mobile computing device 10 of FIG. 1 being mounted thereto in accordance with the present invention is shown. Docking station 30 includes a base 31 having a port replicator/connection electronics housing 32 and a stability platform 33. Stability platform 33 is coupled through biased hinge mechanisms 36 (described in more detail below) to an adjustment arm 40. The adjustment arm is in turn coupled through biased hinge mechanisms 36 to a receiving tray 51 that receives the mobile computing device. Receive tray 51 contains a receiving port 50 to which the docking port 20 (see FIG. 1) of a mobile computing device mounts during docking. Receiving tray 51 also contains a mobile computing device ejection mechanism 52 (discussed in more detail below).

Mobile computing device 10 is shown with screen 12 folded all the way back. Arrow B indicates the path the mobile computing device follows in being mounted on to receive tray 51 (such that port 20 mounts into port 50). The configuration of adjustable arm 40 and receiving tray 51, and the biased pivots that interconnect them, permit both adjustment of the height and viewing angle of screen 12. Thus the height and viewing angle of screen 12 can be adjusted to settings that are comfortable to an operator. Accordingly, docking station 30 significantly reduces unpleasant physical strain on an operator and in many cases will eliminate the need for a separate desk top monitor.

Figure 3A:
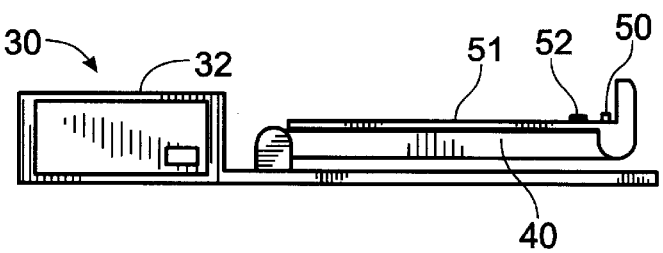
FIGS. 3A–3D are side views of the docking station of FIG. 2 in four different positions in accordance with the present invention.
Figure 3B:
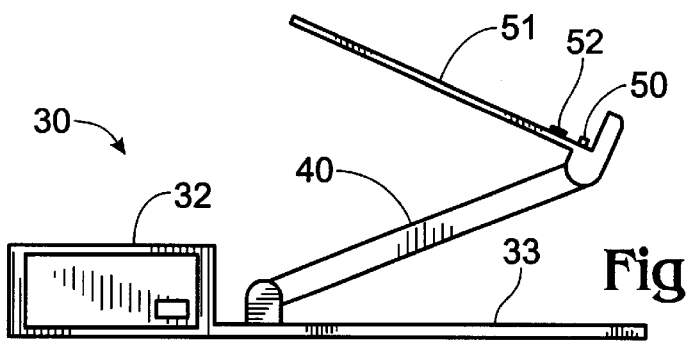
Figure 3C:
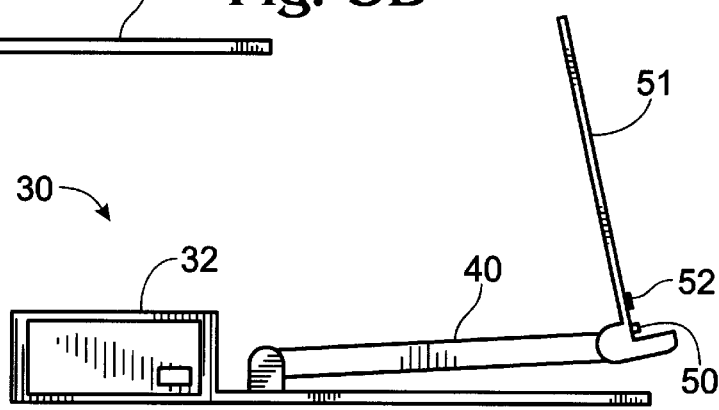
Figure 3D:
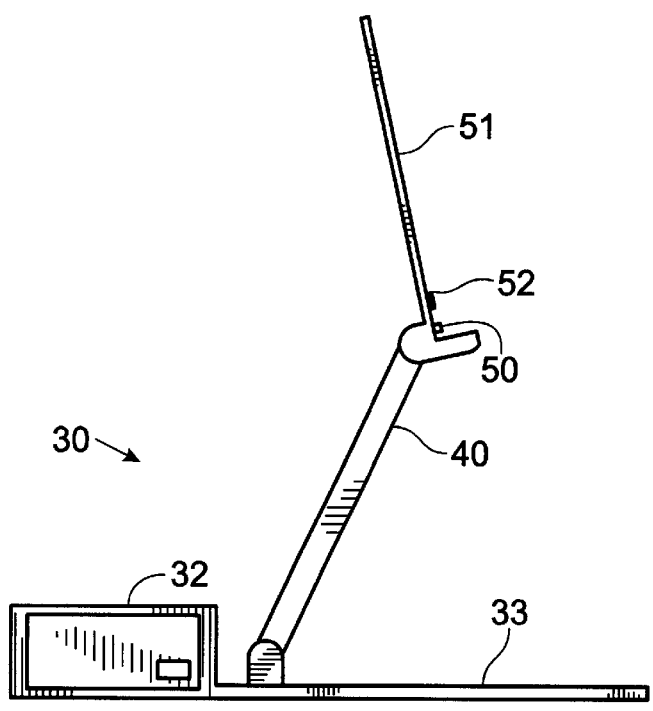

Referring to FIGS. 3A–3D, side views of docking station 30 in four different positions in accordance with the present invention are shown. FIG. 3A illustrates docking station 30 in the folded up position in which arm 40 sits on platform 33 and tray 51 sits on arm 30. In this position docking station 30 has a low profile and can readily fit under a monitor stand or in another inconspicuous space. Receiving port 50 is still exposed, however, so that a mobile computing device can be docked even when receiving tray 51 is not elevated. FIG. 3B illustrates range of motion of arm 40 and tray 51. FIG. 3C illustrates a low level position of tray 51, while FIG. 3D illustrates an elevated position of tray 51.

Referring to FIG. 4, a cross-sectional view of adjustment arm 40 and a portion of tray 51 in accordance with the present invention is shown. A flex cable 41 is provided within arm 40 for communicating electrical signals from receiving port 50 to docking station electronics within housing 32. Cable 41 may pass through housing 32 to replicated ports 34 and/or pass through processing electronics represented by reference numeral 35. The configuration of connections and circuitry within housing 32 will depend on the desired function of docking station 30. For example, docking station 30 may simply be a port replicator or it may include enhancements such as extension of the PCI bus into the housing and support of PCI, ISA and PCMCIA devices. The configuration of connections and circuitry within housing 32 is generally known in the art.

Referring to FIG. 5, a perspective view of a connection hinge mechanism 36 in accordance with the present invention is shown. Hinge 36 includes a plastic housing 35 in which is preferably housed a plastic cylinder 34 with a metal rod 38 therein. The rod fits into a complementary socket (not shown but known) in adjustment arm 40. Spring 42 offsets the force of gravity. Hinge mechanism 36 is known in the art.

Referring to FIG. 6, a cut away view of tray 51 illustrating an undocking mechanism 52 in accordance with the present invention is shown. Each undocking mechanism is pivotally mounted to the receiving tray and configured such that force in the direction of arrow C on face 53 causes movement of face 54 in the direction of arrow D. When a mobile computing device is docked, face 53 extends above the surface of tray 51. When face 53 is depressed, for example, in response to pressure from an operator's finger, face 54 extends out of the surface of the tray, contacting the keyboard face of the mobile computing device and pushing port 20 off of receiving port 50.

Referring to FIG. 7, a side view of a double hinge of mobile computing device 10 (shown in FIGS. 1 and 2) in accordance with the present invention is shown. U.S. Pat. No. 5,644,516 issued to Podwalny et al for a Portable Computer discloses several double hinge arrangements. This patent is commonly assigned to the assignee of the present application and is hereby incorporated by reference as if fully set forth herein.

In the embodiment of FIG. 7, double hinge 14 has a first pivot 3 that is connected to housing 11 through bracket 4 and a second pivot 5 that is connected to screen 12 by shaft 7. If the height of the housing is X, then pivot 3 is preferably positioned at ½X so that screen 12 has the same positional relationship on both sides of housing 11. In a preferred embodiment, pivoting bracket 4 and pivoting shaft 6 are hollow and provide a conduit for electrical wires 8 that propagate signals from processing electronics in the housing (generally represented by reference numeral 8) to screen 12 for display. Alternatively, a sturdy ribbon cable or the like could be connected from electronics 15 through housing 11 to screen 12.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A docking station, comprising:
    a docking station body having a replicated port formed in at least a first wall thereof;
    a receiving port electrically coupled to said replicated port, wherein said receiving port is capable of interfacing to a docking port on a mobile computing device having a housing and a keyboard on a first surface of the housing, wherein said docking port on said mobile computing device is formed on same said first surface of said housing as said keyboard; and
    means coupled between said docking station body and said receiving port the permits movement of said receiving port relative to said replicated port.

2. The docking station of claim 1, wherein said body includes a platform for stability.

3. The docking station of claim 1, further comprising a receiving tray in which said receiving port is located for providing support to a mobile computing device docked at said receiving port.

4. The docking station of claim 3, wherein said receiving tray is capable of movement between a non-extended position in which said tray is located proximate said body and disposed generally horizontally and an extended position in which said tray is extended above said body and disposed at an angle approaching vertical.

5. The docking station of claim 4, wherein said relative movement permitting means includes a pivotal arm mechanism coupled between said docking station body and said receiving tray.

6. The docking station body of claim 4, wherein said receiving port is configured in said receiving tray in such a manner as to receive said docking port of said mobile computing device at least when said receiving tray is in said non-extended position.

7. The docking station of claim 1, further comprising means for undocking said mobile computing device docked at said receiving port.

8. The docking station of claim 3, further comprising adjustable arm means coupled between said body and said receiving tray for supporting said receiving tray in a manner that permits adjustment of the height of said receiving tray relative to said body.

9. The docking station of claim 8, wherein said adjustable arm means and said receiving tray are coupled such that the viewing angle of a screen of said mobile computing device docked at said docking station is adjustable.

10. A docking station, comprising:
    a docking station body having a replicated port formed in at least a first wall thereof; and
    a receiving port electrically coupled to said replicated port, wherein said receiving port is capable of interfacing to a docking port on a mobile computing device having a housing and a keyboard on a first surface of the housing, wherein said docking port on said mobile computing device is formed on same said first surface of said housing as said keyboard; and wherein said receiving port is capable of movement between a non-extended position in which said port is disposed proximate said body and an extended position in which said port is extended above said body.

11. The docking station of claim 10, further comprising a receiving port support structure coupled between said body and said receiving port and an adjustable arm mechanism coupled between said body and said receiving port support structure for supporting said receiving port support structure in such a manner that permits adjustment of the height of said receiving port support structure relative to said body.

12. The docking station of claim 10, wherein said receiving port support structure is coupled to said body in such a manner that the viewing angle of a screen of said mobile computing device docked at said docking station is adjustable.

13. The docking station of claim 10, wherein said body includes a platform for stability.

14. A docking station, comprising:
    a docking station body having a replicated port formed in at least a first all thereof;
    a receiving port electrically coupled to said replicated port, wherein said receiving port is capable of interfacing to a docking port on a mobile computing device having a housing and a keyboard on a first surface of the housing, wherein said docking port on said mobile computing device is formed on same said first surface of said housing as said keyboard;
    a mechanism that is capable of receiving a screen of said mobile computing device when docked at said docking station; and
    means coupled between said docking station body and said screen receiving mechanism that permits adjustment of the height of said screen receiving mechanism relative to said docking station body.

15. The docking station of claim 14, wherein said screen receiving mechanism is coupled to said body in such a manner that the viewing angle of said screen therein is adjustable.

* * * * *

UNITED STATES PATENT AND TRADEMARK OFFICE
CERTIFICATE OF CORRECTION

PATENT NO. : 6,556,435 B1
DATED : April 29, 2003
INVENTOR(S) : Jacques H. Helot

It is certified that error appears in the above-identified patent and that said Letters Patent is hereby corrected as shown below:

Column 6,
Line 21, delete "all" and insert therefor -- wall --

Signed and Sealed this

First Day of February, 2005

JON W. DUDAS
*Director of the United States Patent and Trademark Office*